United States Patent
Watanabe

[11] Patent Number: 5,836,266
[45] Date of Patent: Nov. 17, 1998

[54] APPARATUS FOR CONNECTING SHELLFISH TO CULTURE ROPE

[75] Inventor: Kohei Watanabe, Hakodate, Japan

[73] Assignee: Kabushiki Kaisha Towa Denki Seisakusho, Hokkaido, Japan

[21] Appl. No.: 970,939

[22] Filed: Nov. 14, 1997

[30] Foreign Application Priority Data

Nov. 20, 1996 [JP] Japan .................................. 8-323330

[51] Int. Cl.$^6$ .................................................. A01K 61/00
[52] U.S. Cl. ............................ 119/234; 452/12; 119/237
[58] Field of Search .................................. 119/234, 236, 119/238, 239, 240, 241, 237; 43/45; 452/12, 185, 186

[56] References Cited

U.S. PATENT DOCUMENTS

| | | | |
|---|---|---|---|
| 5,443,682 | 8/1995 | Edmonds et al. | 119/238 X |
| 5,494,482 | 2/1996 | Sakamoto et al. | 452/185 |

FOREIGN PATENT DOCUMENTS 406245666  9/1994  Japan .

Primary Examiner—Robert P. Swiatek
Assistant Examiner—James S. Bergin
Attorney, Agent, or Firm—Dann, Dorfman, Herrell & Skillman, P.C.

[57] ABSTRACT

An apparatus is used to connect shellfish to a culture rope, which includes a shellfish transfer unit (5, 23, 29, 31) that transfers shellfish in a predetermined direction, shellfish (7) being transferred, two by two, in parallel upstanding orientation with their ear end portions (7a) down. The shellfish transferred by the shellfish transfer unit is stopped at a predetermined stop position defined by stoppers (39, 41). A culture rope (51) is supplied to a space between the ear end portions of two shellfish in the stop position. An ear spacer (50) and a pair of shellfish supporting pads (43, 45) cooperate each other to secure the scallops in the stop position where they are subjected to the piercing operation by a piercing unit and the pin-inserting operation by a pin inserting unit so that the ear end portions of two scallops held in parallel relation in the stop position are connected to the culture rope positioned and extending therebetween.

12 Claims, 16 Drawing Sheets

APPARATUS FOR CONNECTING SHELLFISH TO CULTURE ROPE

BACKGROUND OF THE INVENTION

1. Field of the Invention

The present invention relates to an apparatus for connecting shellfish to a culture rope, and more particularly, to an apparatus capable of automatically locating shellfish such as scallops, in predetermined posture, at predetermined position where the ear end portions of the shellfish and the culture rope running therebetween are pierced in series so that they are connected to the culture rope by means of a pin or other connecting member passing through the pierced holes.

2. Description of the Prior Art

Shellfish piercing operation must be done while the shellfish is held in a predetermined position. In the prior art, this has been achieved by inserting the shellfish into a shellfish holder. FIGS. 23A and 23B show an example of the prior art shellfish holders for holding and positioning the shellfish in the piercing operation. More particularly, an operator manually inserts two scallops 213a, 213b in horizontal or lying state onto platforms 201a, 201b at different levels, until the ear end portions 215a, 215b of the scallops 213a, 213b reach stoppers 217a, 217b, as shown by arrows in FIGS. 23A and 23B. Thus, the ear end portion 215a of one scallop 213a is positioned above a culture rope 219 and the other 215b is below. In this condition, both ear end portions 215a, 215b and the rope 219 are pierced in series so that two scallops 213a, 213b can be connected to the rope 219.

When inserting two scallops 213a, 213b into the holder, it can be confirmed that the ear end portion 215a of the upper scallops 213a (left-hand one in FIGS. 23A and 23B) collides with the upper stopper 217a. However, since the other, lower stopper 217b is hidden below the upper scallop 213a and the rope 219, the operator could not see the stop position of the lower scallop 213b (right-hand one) during insertion. Thus, shellfish inserting operation using the above described prior art holder should be a nervous, laborious task. If one of the scallops 213a, 213b, especially the lower one 213b is out of position on the holder, though the upper scallop 213a and the rope 219 can easily be pierced but it is likely that the lower scallop is not pierced due to its offset position, in which case two scallops 213a, 213b can not be connected to the rope 219.

These drawbacks may be eliminated by using a device shown in Japanese patent laid-open publication No. 2-262934. This device has a holder unit 301 for temporary positioning a pair of shellfish (scallops 303a, 303b), including a pair of bipod springs 307a, 307b connected to an elevatable drive shaft 305, as shown in FIG. 24. The holder unit 301 also includes a pair of stoppers 311a 311b for defining the shellfish position. In operation, as the drive shaft 305 is lowered, the springs 307a, 307b exert greater resilient force to the scallops 303a, 303b held by the holder unit 301, so that the scallops 303a, 303b are held at predetermined position where they are subjected to piercing operation. A pair of brush members 313a, 313b cooperate with the springs 307a, 307b to hold the scallops 303a, 303b in position.

The above described prior art device is satisfactory in some application but still have several disadvantages. First, with this holder, downward resilient force exerted by the springs 307a, 307b and sidewall-urging force by the brush members 313a, 313b must be well balanced with each other to hold the scallops 303a, 303b. With all such troublesome adjustment, the springs 307a, 307b and the brush members 313a, 313b could not stably hold the scallops 303a, 303b and, therefore, allow displacement or movement of the scallops while they are drilled together with a culture rope (not shown in FIG. 24) running therebetween.

Further, this prior art device is not suitably applicable to hold various shellfish that may greatly vary in size. For example, scallops are normally 5–11 cm in length and 1–2 cm in thickness. In order to hold small-size scallops, it is necessary to use relatively small (low) stoppers 311a, 311b to prevent contact from the rounded main body portions of the scallops 303a, 303b. However, large-size scallops tend to roll and fall down after collision with such low stoppers. On the other hand, relatively large (high) stoppers are suitably used for large-size scallops but would prevent small-size scallops from arriving at predetermined position.

SUMMARY OF THE INVENTION

Accordingly, it is an object of the present invention to overcome the drawbacks and disadvantages of the prior art techniques in locating and piercing the shellfish.

Another object of the present invention is to provide a novel apparatus capable of automatically transferring shellfish to a definite position where the shellfish is subjected to piercing and pin-inserting operation.

Yet another object of the present invention is to automatically transfer shellfish to a piercing position with its posture being unchanged.

According to an aspect of the present invention there is provided an apparatus for connecting shellfish to a culture rope comprising a shellfish transfer unit that transfers shellfish in a predetermined direction, shellfish being transferred, two by two, with parallel upstanding posture of their ear end portions down; stopper means for stopping, at a predetermined stop position, the shellfish transferred by said shellfish transfer unit; a rope supplying unit that supplies a culture rope to a space between ear end portions of two shellfish in the stop position; an ear spacer arranged between and contacting with the ear end portions of two shellfish in the stop position; a pair of shellfish supporting pads cooperating with said ear spacer to support therebetween two shellfish in the stop position; a piercing unit that pierce, in series, the ear end portions of two shellfish held in the stop position and the culture rope supplied between the ear end portions by said rope supplying unit; and a pin inserting unit that insert a connecting pin into holes pierced by said piercing unit in the ear end portions and the culture rope to connect the two shellfish to the culture rope.

In a preferred embodiment, the shellfish transfer unit comprises a first transfer unit that transfers shellfish in a first predetermined direction to an turning position and a second transfer unit that transfers shellfish from the turning position to the stop position to a second predetermined direction substantially perpendicular to the first predetermined direction.

In this embodiment, the second transfer unit may comprise first means for forcing the shellfish from the turning position to an intermediate position and second means for conveying the shellfish from the intermediate position to the stop position. The first means may comprise one or more of reciprocating pusher members adapted to push shellfish forward in the second predetermined direction, and the second means may comprise one or more of belt conveyors adapted to receive the shellfish from said pusher members and further convey the shellfish forward in the second predetermined direction. Preferably, the belt conveyor conveys the shellfish at a speed higher than by the pusher members.

In another preferable embodiment, the second transfer unit transfers shellfish further from the stop position substantially in the second predetermined direction irrespective of whether said piercing unit and/or said pin inserting unit operate in success or failure. This embodiment assures continuous and automatic operation of the apparatus and prevents stagnation which could be caused when the shellfish that has been failed to be pierced and/or connected to the pin remains in the stop position.

The stopper means may include one or more stopper members arranged in the path of transfer of the shellfish transfer unit. Otherwise, the stopper means may include one or more sensors for detecting that the shellfish reach the stop position. When employing the sensor, the shellfish transfer unit may make a stop when the sensor detects that the shellfish reach the stop position.

The ear spacer is preferably made of soft elastic material, a typical example of which is urethane rubber material, to prevent any damage to the ear end portions of shellfish when clamped between the opposite shellfish supporting pads in the stop position.

In a preferable embodiment, there are provided a pair of the shellfish transfer units, and the stopper means, the rope supplying unit, the ear spacer, a pair of the shellfish supporting pads, the piercing unit and the pin inserting unit are arranged for each of the shellfish transfer units, so that four shellfish are connected to two culture ropes at the same time.

BRIEF DESCRIPTION OF THE DRAWINGS

Other objects and advantages of the present invention can be understood from the following description when read in conjunction with the accompanying drawings in which.

DETAILED DESCRIPTION OF THE PREFERRED EMBODIMENTS

Figure 2:
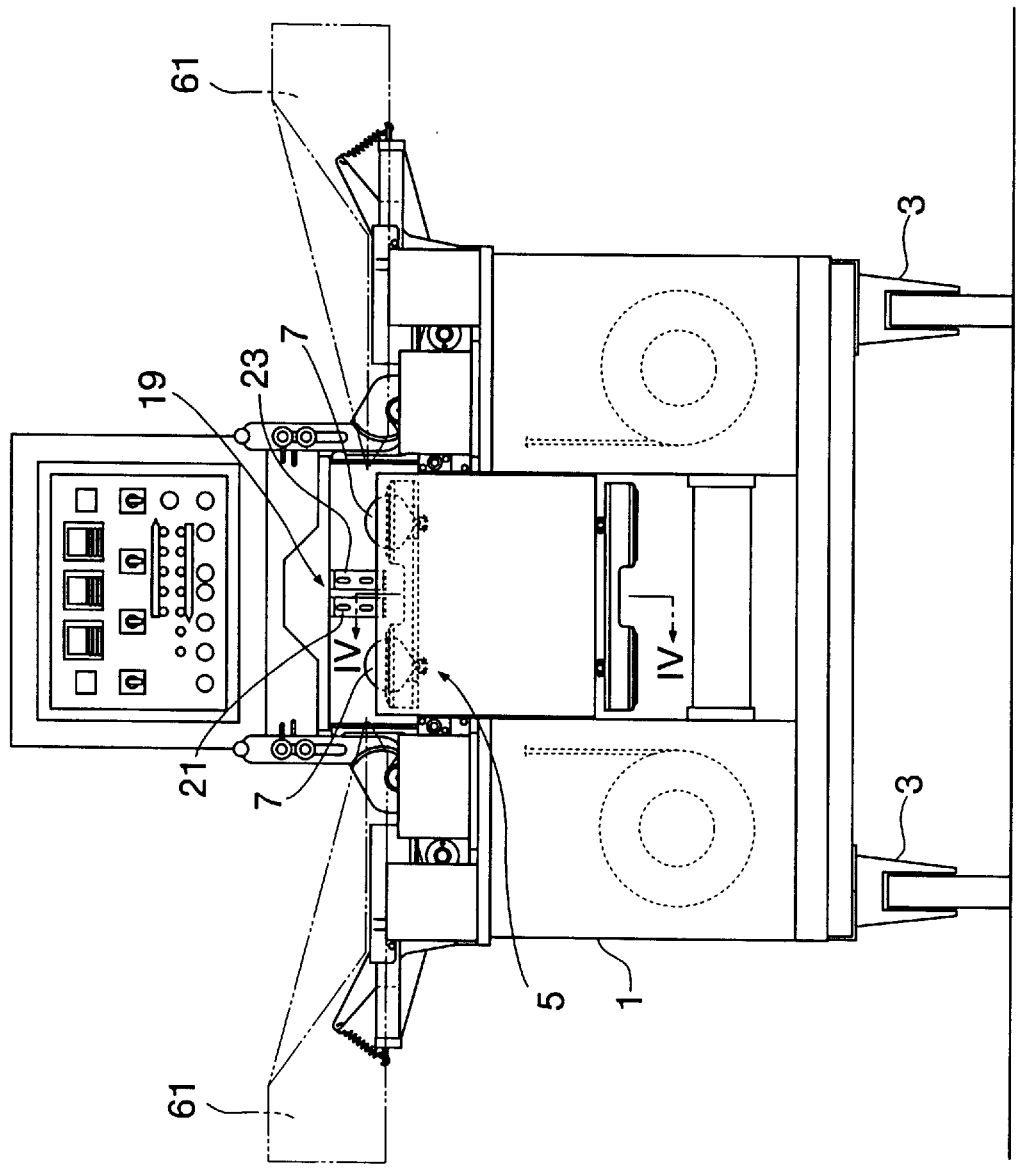
FIG. 2 is a front view of the apparatus.
Figure 3:
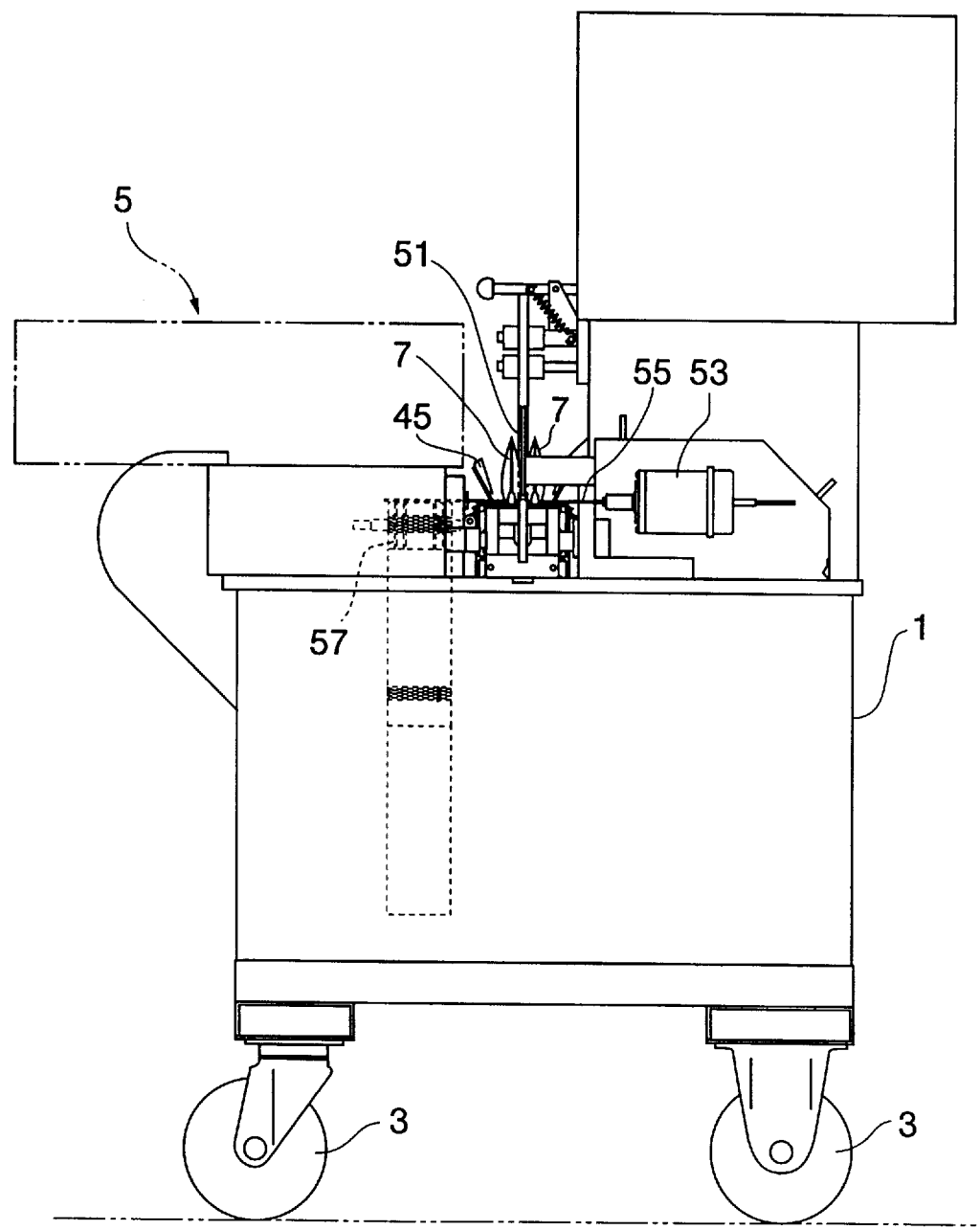
FIG. 3 is a side view of the apparatus.

An apparatus according to a preferred embodiment of the present invention will be described hereinbelow in reference to FIG. 1 to FIG. 22. Specifically referring to FIG. 1 through FIG. 3, the apparatus has a generally box-shaped housing 1 provided with casters 3, 3 at four corners of the bottom thereof, so that the apparatus is easy to be moved to any desired location.

Figure 4:
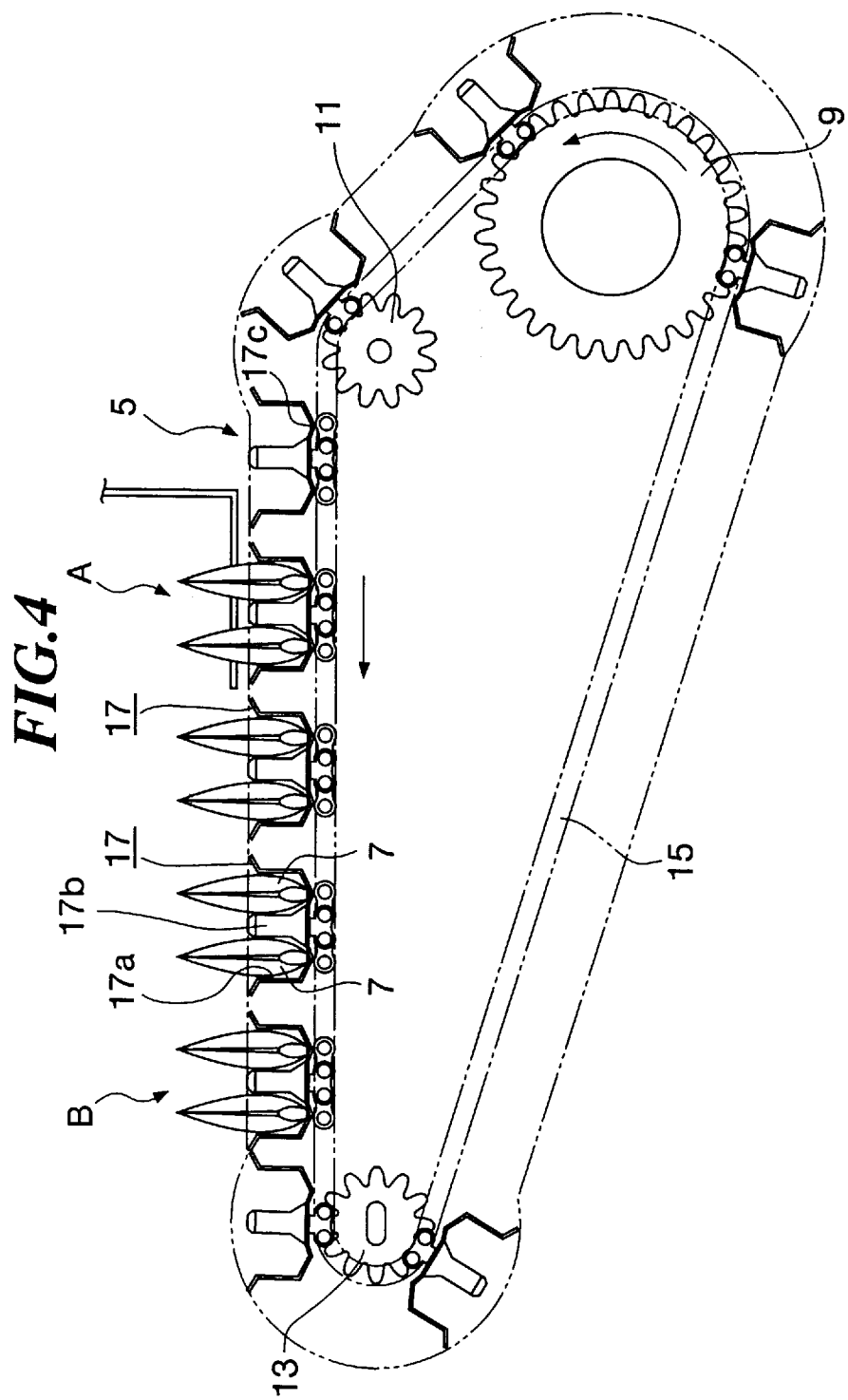
FIG. 4 is a cross-section taken along the line IV—IV in FIG. 2.

A first shellfish transfer unit 5 is arranged on a central portion of the housing 1. In this embodiment the first shellfish transfer unit 5 is a conveyor comprising a drive sprocket 9 driven by a drive motor (not shown), a pair of slave sprocket 11, 13, an endless chain 15 stretched around sprockets 9, 11, 13 and shellfish holders 17 connected, with predetermined interval, to the outer surface of chain 15, as shown in FIG. 4. When the drive motor is driven to rotate drive sprocket 9 in a counter clockwise direction in FIG. 4, chain 15 is caused to run in the same direction to transfer, on a substantially horizontal plane and in a predetermined direction, shellfish (scallops 7, 7 in this embodiment) contained in shellfish holders 17.

Figure 1:
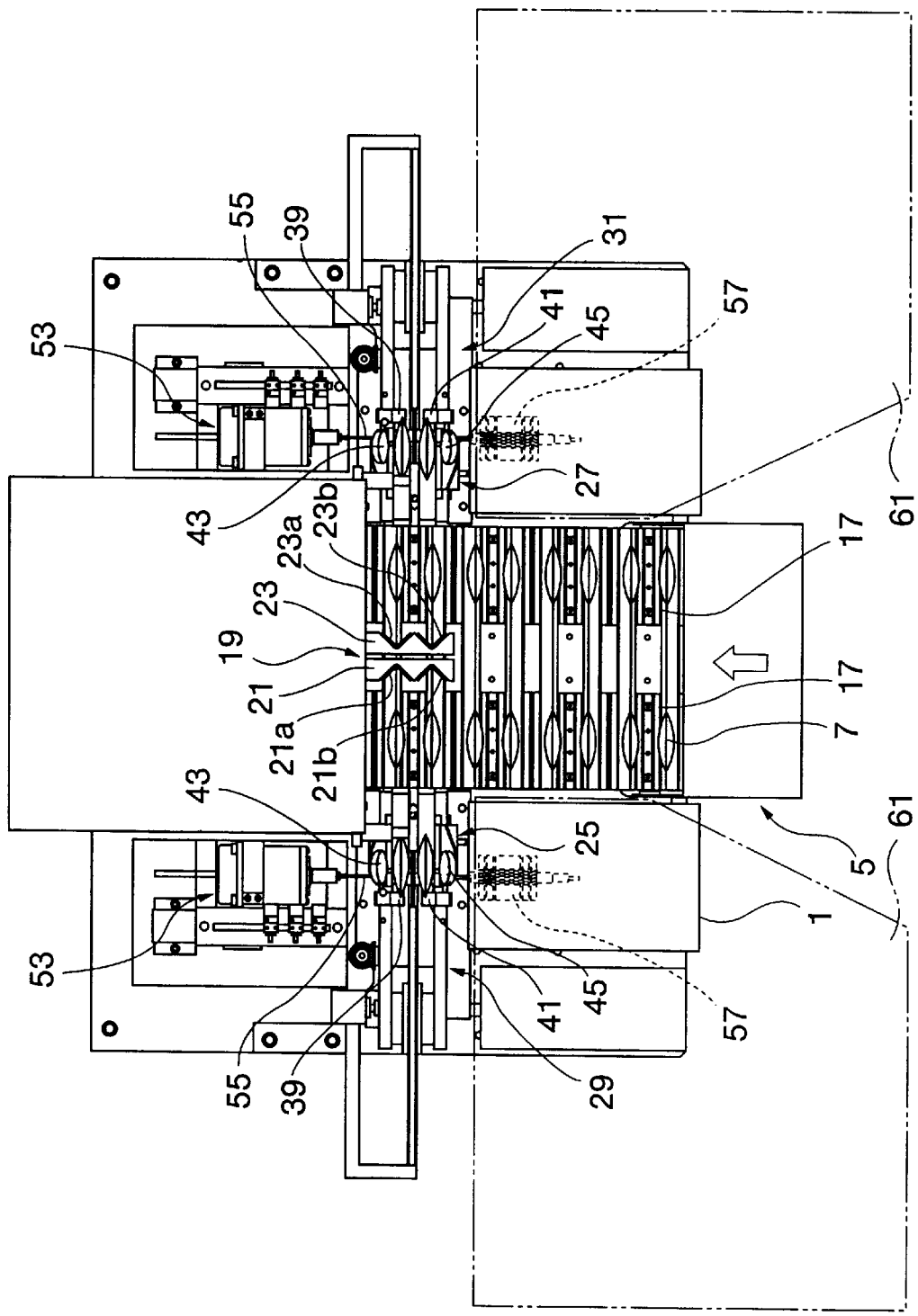
FIG. 1 is a plan view showing an apparatus according to a preferred embodiment of the present invention.
Figure 11:
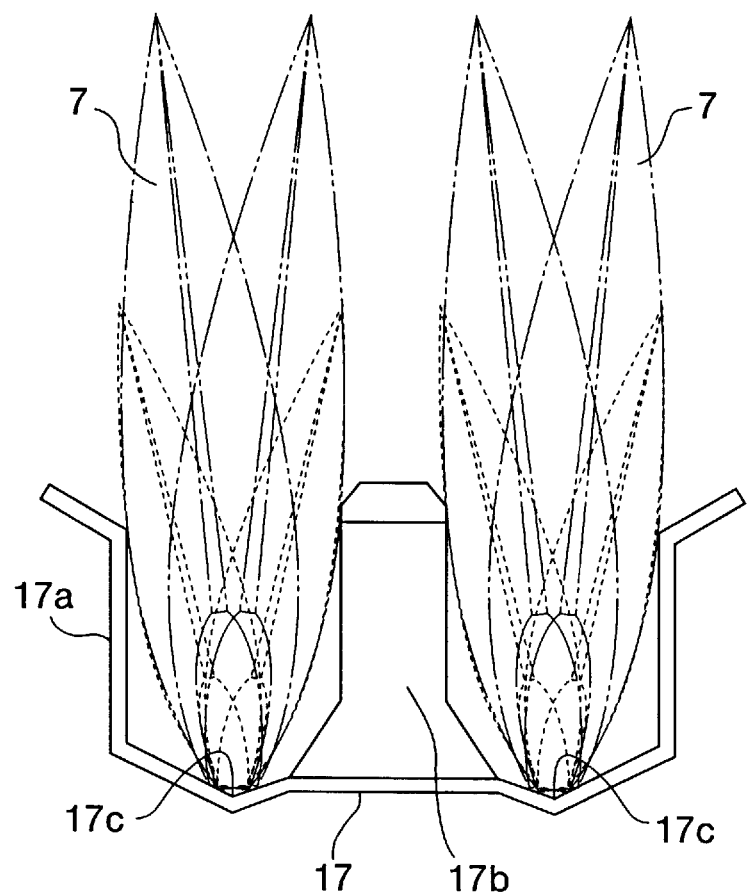
FIG. 11 is an enlarged view showing the shellfish holder together with a pair of shellfish held therein, in which large-size shellfish are shown in phantom lines and small-size one in dotted lines.
Figure 12:
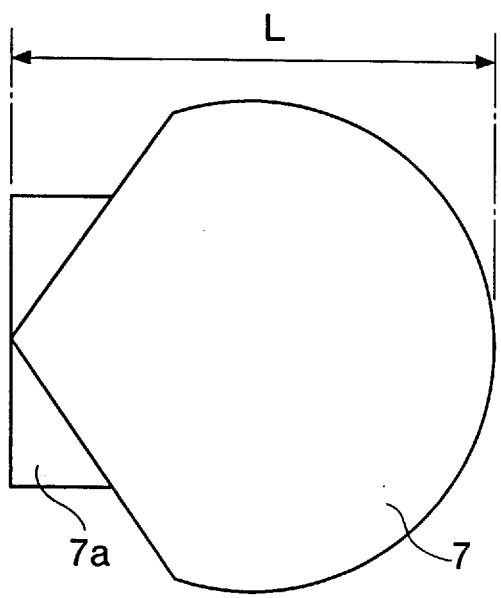
FIG. 12 is a plan view diagrammatically showing a scallop, a typical one of shellfish to be treated by the apparatus.
Figure 13:
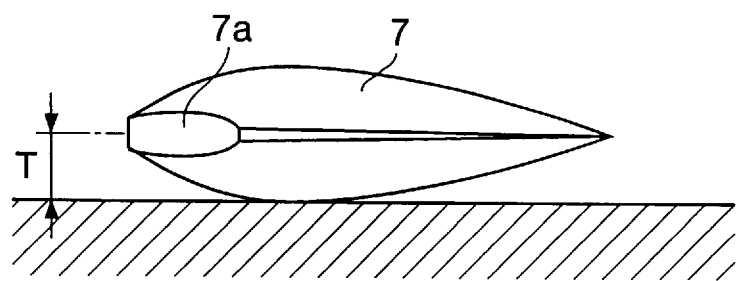
FIG. 13 is a front view diagrammatically showing a scallop when it is lying on a horizontal plane.

A pair of shellfish holders 17, 17 are arranged side by side on chain 15 (see FIG. 1). Each shellfish holder 17 accommodates a pair of scallops 7, 7 in a parallel relation. A plurality of scallops to be treated by the apparatus are stored in a pair of shellfish reservoir 61, 61 on the opposite sides of first shellfish transfer unit 5. An operator manually inserts two scallops 7, 7 into respective shellfish holders 17 that have reached an entry position (A) in FIG. 4. Four scallops 7 in total that have been held in upstanding posture by two shellfish holders 17, 17 at the entry position (A) are then conveyed to a turning position (B). More particularly, each shellfish holder 17 comprises a generally U-shaped cross-sectional trough 17a and a central partition wall 17b that extends perpendicular to the direction of conveyance to divide an interior of trough 17a into two halves, forward and rearward sections, each being capable of receiving and holding a scallop 7 in an upstanding posture with its ear end portion 7a down. The bottom of each sections in shellfish holders 17 has a laterally extending groove 17c (FIGS. 4, 8 and 11) for engaging the bottom edge 7b (FIG. 9) of ear end portion 7a. This facilitates stable positioning of scallops 7, 7 in each holder 17. Each section in holder 17 may accommodate and support a scallop 7 irrespective of its size, as can be seen in FIG. 11.

Since bottom edge 7b of ear end portion 7a of scallop 7 is engaged within groove 17c, scallop 7 is only swingable within a relatively small angle restricted by the outer wall of trough 17a and central partition wall 17b.

First shellfish transfer unit 5 transfers scallops 7, 7 to the turning position (B) where (four) scallops 7, 7 in a pair of shellfish holders 17, 17 are removed therefrom by a shellfish push unit 19 including a pair of pusher members 21, 23 and a drive unit (not shown) for reciprocating pusher members 21, 23 in synchronism with each other but in opposite directions. More particularly, both pusher members 21, 23 resting at standby positions (shown in solid lines in FIGS. 5 and 6) are driven by the drive unit to separate from each other so that scallops are removed from holders 17, 17 and transferred in directions perpendicular to the direction of transfer by first shellfish transfer unit 5. After pusher members 21, 23 have been moved to a predetermined position shown in phantom lines in FIGS. 5 and 6 to thereby transfer scallops 7, 7 to predetermined positions, they returns to the standby positions. FIGS. 1, 2, 8 and 9 show pusher members 21, 23 in the standby positions.

Figure 10:
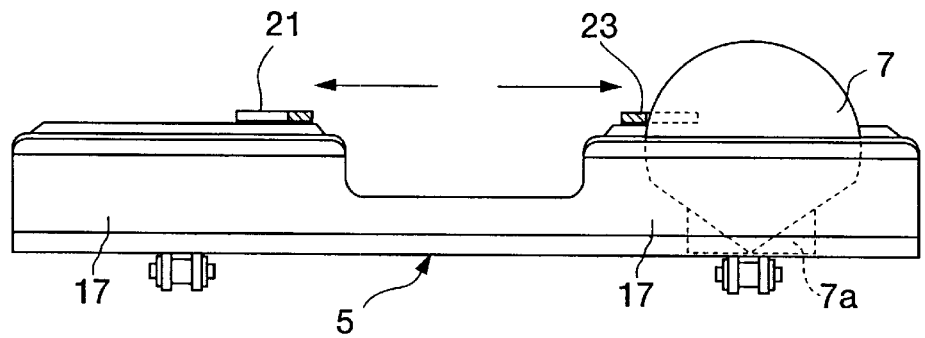
FIG. 10 is an enlarged side view of the shellfish push unit where pusher members have been moved from the standby positions to laterally move the shellfish (scallops) in the shellfish holder.

Pusher member 21 has a pair of notches 21a, 21b for engagement with the side rounded edges of scallops 7, 7. Likewise, pusher member 23 has a pair of notches 23a, 23b for engagement with the side rounded edges of scallops 7, 7. Thus, by separating movement of pusher members 21, 23 from the standby positions, four scallops 7, 7 are removed from shellfish holders 17, 17 at the same time, as shown in FIG. 10. Although scallops 7, 7 held in the left holder 17 are omitted in FIGS. 8–10, it could be understood that they are transferred to the left by pusher member 21 at the same time and in the same manner as scallops 7, 7 in the right holder 17 are transferred to the right by pusher member 23.

At the opposite sides of shellfish push unit 19 there are arranged a pair of shellfish positioning units 25, 27, which are located above a pair of second shellfish transfer units 29, 31, respectively, as can be seen in FIG. 1. Since shellfish positioning unit 25 and second shellfish transfer unit 29 at the left side of shellfish push unit 19 in FIG. 1 are symmetric with shellfish positioning unit 27 and second shellfish transfer unit 31 at the right side, respectively, only those at the left side will be described hereinunder in reference to FIGS. 5–7.

Second shellfish transfer unit 31 comprises a drive pulley 33 driven by a drive motor (not shown), a slave pulley 35 and an endless belt 37 stretched between pulleys 33, 35. As described before, shellfish pusher member 23 is moved in a lateral direction, that is a direction perpendicular to the direction of transfer by first shellfish transfer unit 5, to a predetermined position shown in phantom lines in FIGS. 5 and 6. Before shellfish pusher member 23 reaches the predetermined position, scallops 7, 7 have been transferred onto the running belt 37 and will further be transported by second shellfish transfer unit 31 in the lateral direction. Belt 37 is made from wire gauze or cloth, steel plate or any other suitable material that would give no damage to scallops 7, 7 even if there arises slippage of scallops 7, 7 on belt 37.

A pair of rotatable shellfish stoppers 39, 41 are positioned in the path of shellfish transportation by second shellfish transfer unit 31. More particularly, shellfish stoppers 39, 41 rest at their open or standby positions as shown by phantom lines in FIG. 5, but are closed to their closed positions shown by solid lines in FIG. 5 when shellfish pusher member 23 (and 21) reaches the stroke end position shown by phantom lines in FIGS. 5 and 6. Accordingly, scallops 7, 7 which have been transferred by belt 37 of second shellfish transfer unit 31 collide with stoppers 39, 41 in the closed positions, so that further shellfish transportation is prohibited while belt 37 continues running. Stoppers 39, 41 will cause scallops 7, 7 to stop at the piercing position where the ear end portions of scallops 7, 7 and a culture rope placing and extending therebetween are pierced in series in a manner to be described later.

Figure 16:
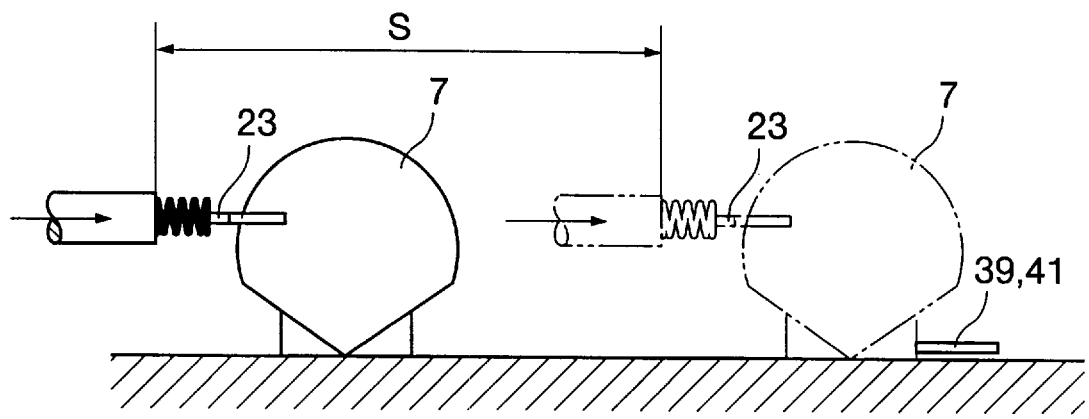
FIG. 16 is an explanatory front view showing another embodiment of the second shellfish transfer unit consisting solely of the shellfish pusher members, which transfer scallops from the position shown in solid lines to the piercing position shown in phantom position.
Figure 17:
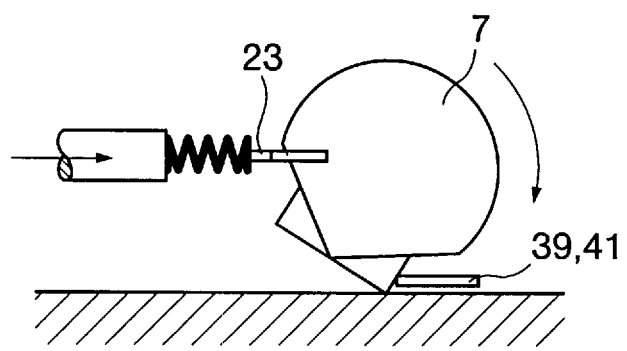
FIG. 17 is an explanatory front view showing the stop position of the scallops which have been transferred by the shellfish pusher members, in which case the scallops tend to be over-transferred and thus fall down after collision with the stoppers.
Figure 18:
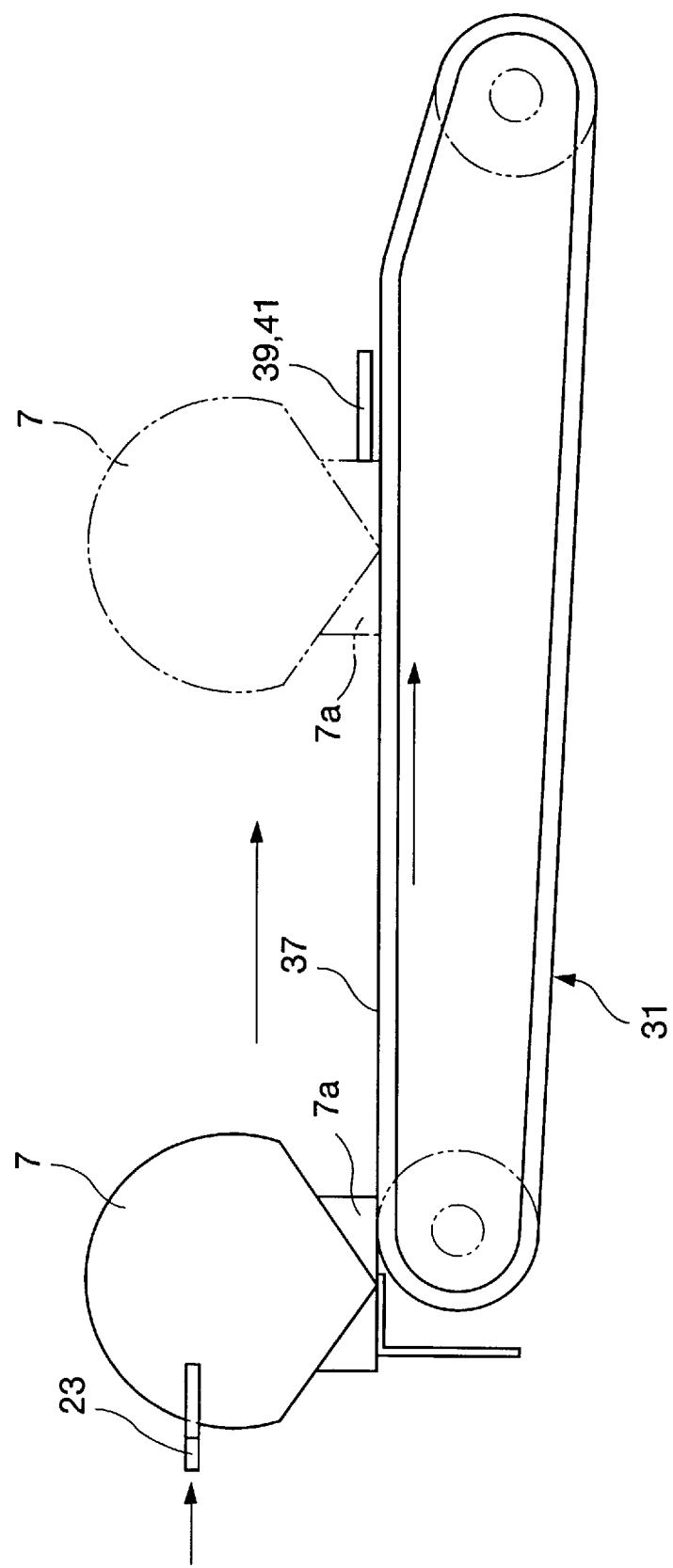
FIG. 18 shows a preferred embodiment of the second shellfish transfer unit comprising the shellfish pusher members and a belt conveyor wherein the stop position of the scallop is shown in phantom lines.
Figure 19:
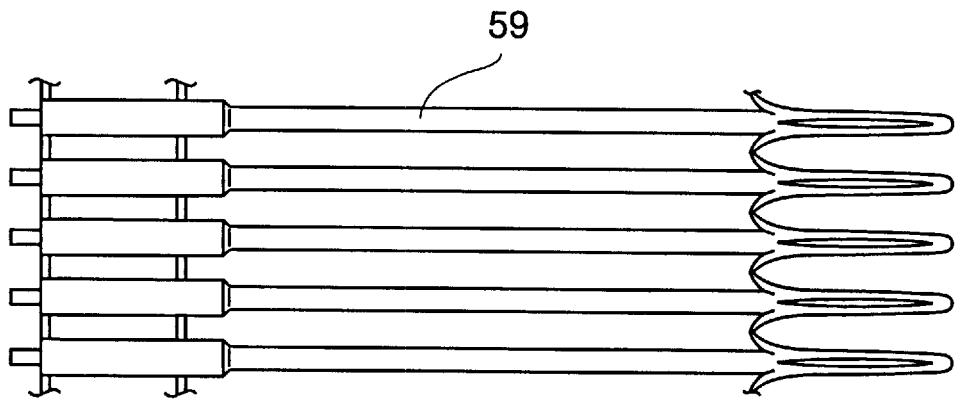
FIG. 19 is a front view showing an example of connecting pins that can be used in combination with the apparatus of this invention.
Figure 20:
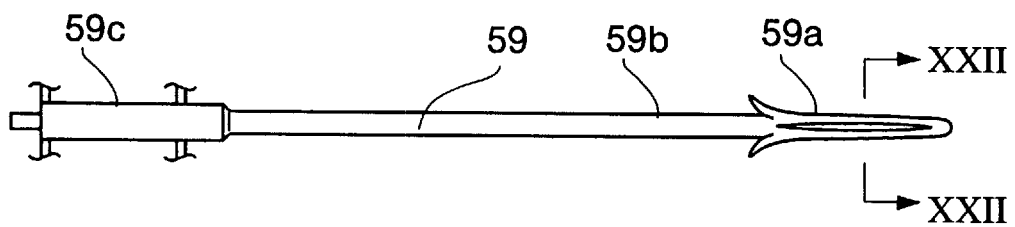
FIG. 20 is a side view of the connecting pins of FIG. 19.
Figure 21:
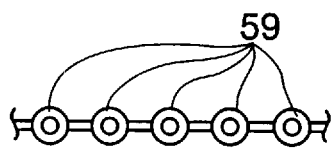
FIG. 21 is a plan view of the connecting pins of FIG. 19.
Figure 22:
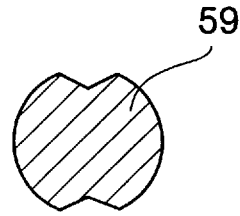
FIG. 22 is a cross-section taken along the lines XXII—XXII.
Figure 23A:
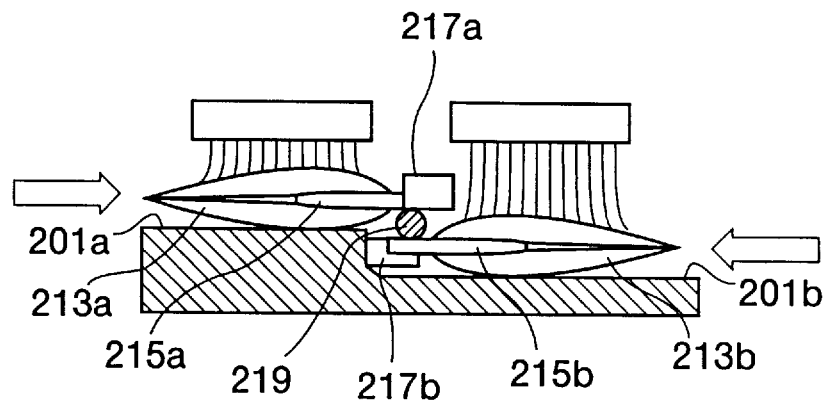
FIGS. 23A and 23B are front cross-section and plan view of the prior art shellfish holder.
Figure 23B:
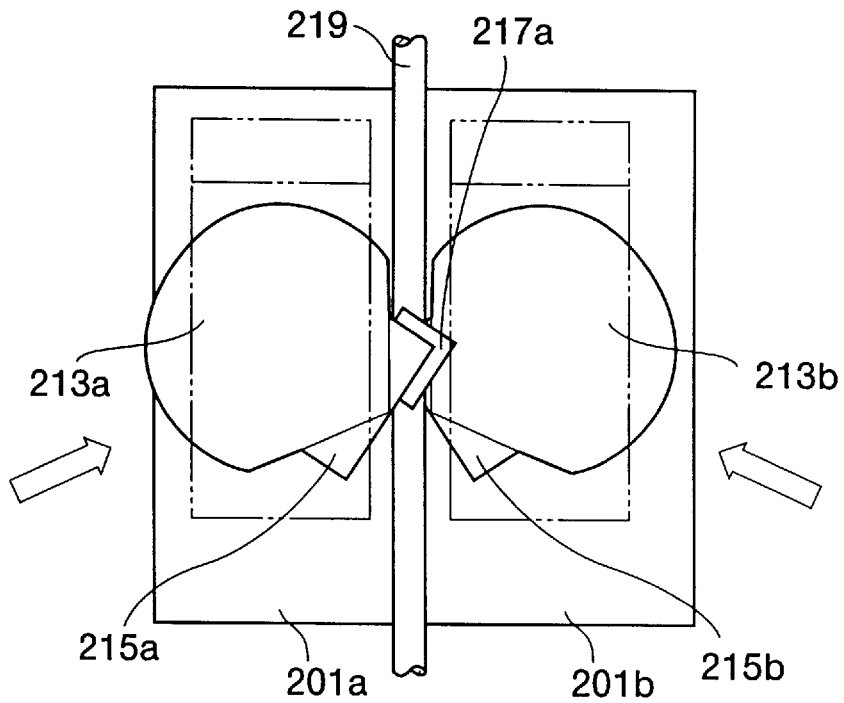
Figure 24:
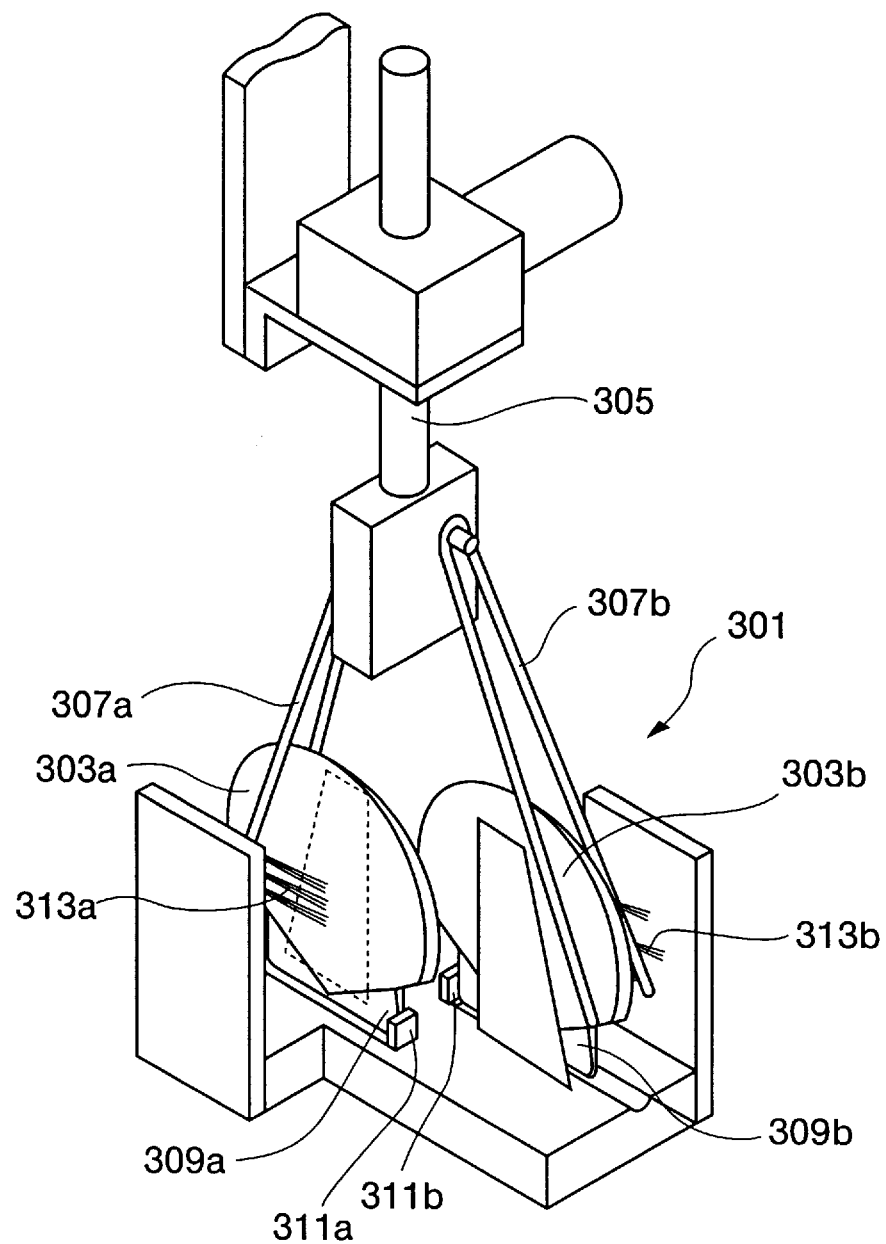
FIG. 24 is a schematic view of another prior art device that holds the scallops for piercing operation.

Although this embodiment employs second shellfish transfer units 29, 31 in addition to shellfish pusher members 21, 23 in order to transfer scallops 7, 7 to the piercing position, it may be possible that second shellfish transfer units 29, 31 are omitted and shellfish transportation to the piercing position is conducted only by shellfish pusher members 21, 23, as shown in FIG. 16. This modified embodiment is, however, somewhat disadvantageous because pusher members 21, 23 should have different stroke (S) depending on the size of scallops 7, 7 to be transferred thereby. Shellfish such as scallops are normally 5–11 cm in length (L) and 1–2 cm in thickness (T), see FIGS. 12 and 13. Moreover, at the piercing position, scallop 7 contacts, at its fore edge portion, with stoppers 39 (41) whereas it is forced by pusher member 23 contacting the aft edge portion of the scallop at a level considerably higher than the contact point with stopper 39 (41), so that the scallop tends to fall down, as shown in FIG. 17. In contrast, in the preferred embodiment shown in FIG. 18, scallop is transferred first by shellfish pusher member 23 to an intermediate position and then by second shellfish transfer unit 31 (belt 37) to the piercing position, which may obviate the above disadvantages. Belt 37 should preferably rotate at a greater speed than the running speed of shellfish pusher members 21, 23.

Figure 7:
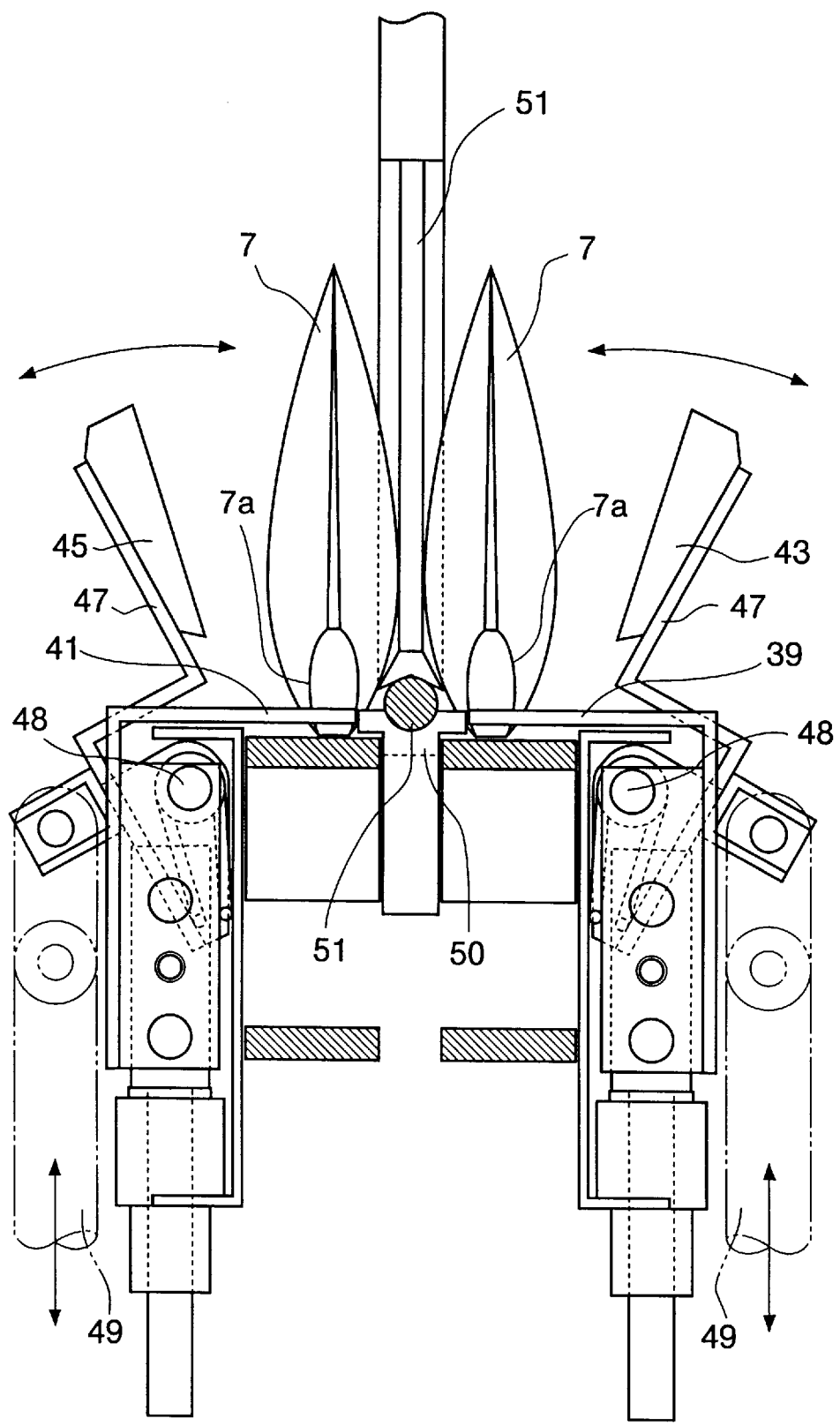
FIG. 7 is a cross-section taken along the line VII—VII in FIG. 6.
Figure 8:
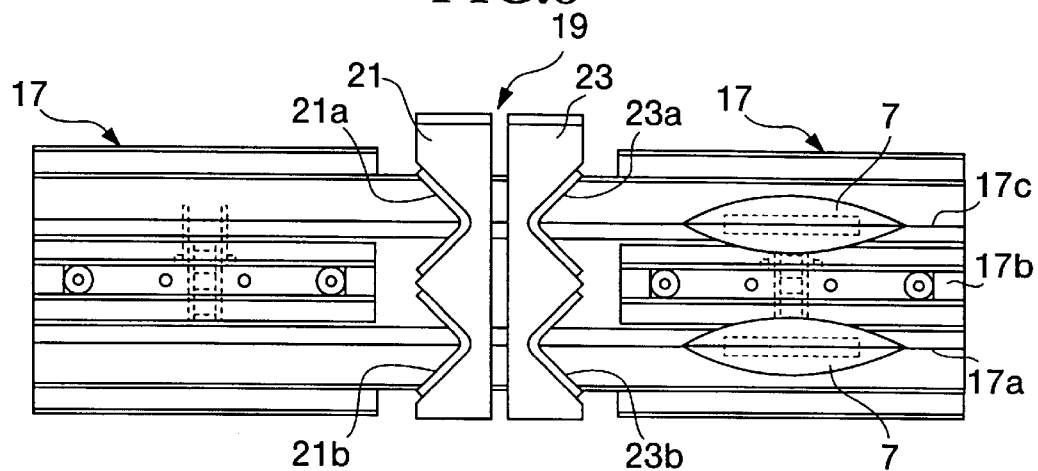
FIG. 8 is an enlarged plan view showing the shellfish push unit of the apparatus.
Figure 9:
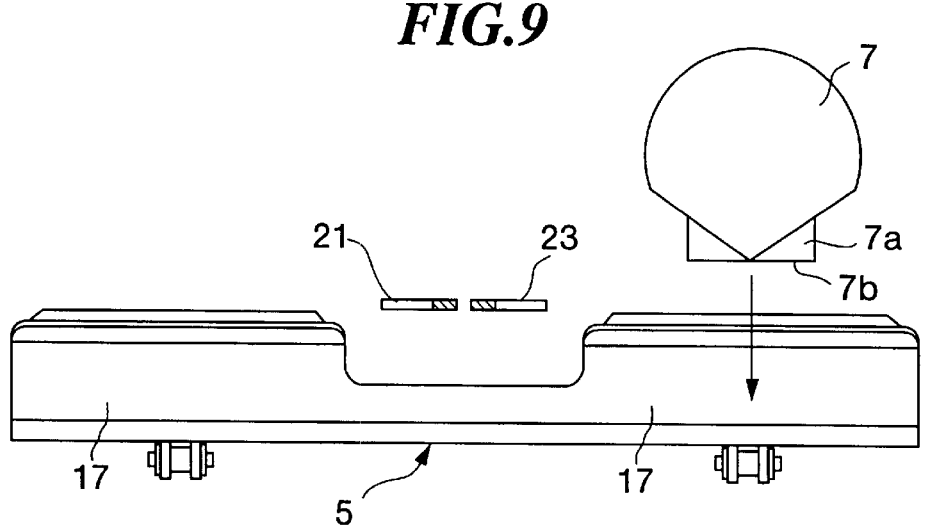
FIG. 9 is an enlarged side view of the shellfish push unit shown in FIG. 8, where pusher members rest in standby positions.

When scallops 7, 7 collide with stoppers 39, 41 to stop at the piercing position, they are held in that position by a pair of shellfish supporting pads 43, 45. Shellfish supporting pads 43, 45 are secured to arms 47 pivottable on shafts 48, as shown in FIG. 7. Two arms 47 are pivotally connected to reciprocating rods 49 of cylinder mechanisms (not shown). FIG. 7 shows arms 47 in open states, which are closed by extension of rods 49. When rods 49 extends, the right side arm 47 rotates counterclockwise and the left side arm 47 rotates clockwise so that scallops 7, 7 are supported between pads 43, 45. The above described shellfish positioning unit 27 comprises shellfish stoppers 39, 41 and shellfish support pads 43, 35.

Figure 6:
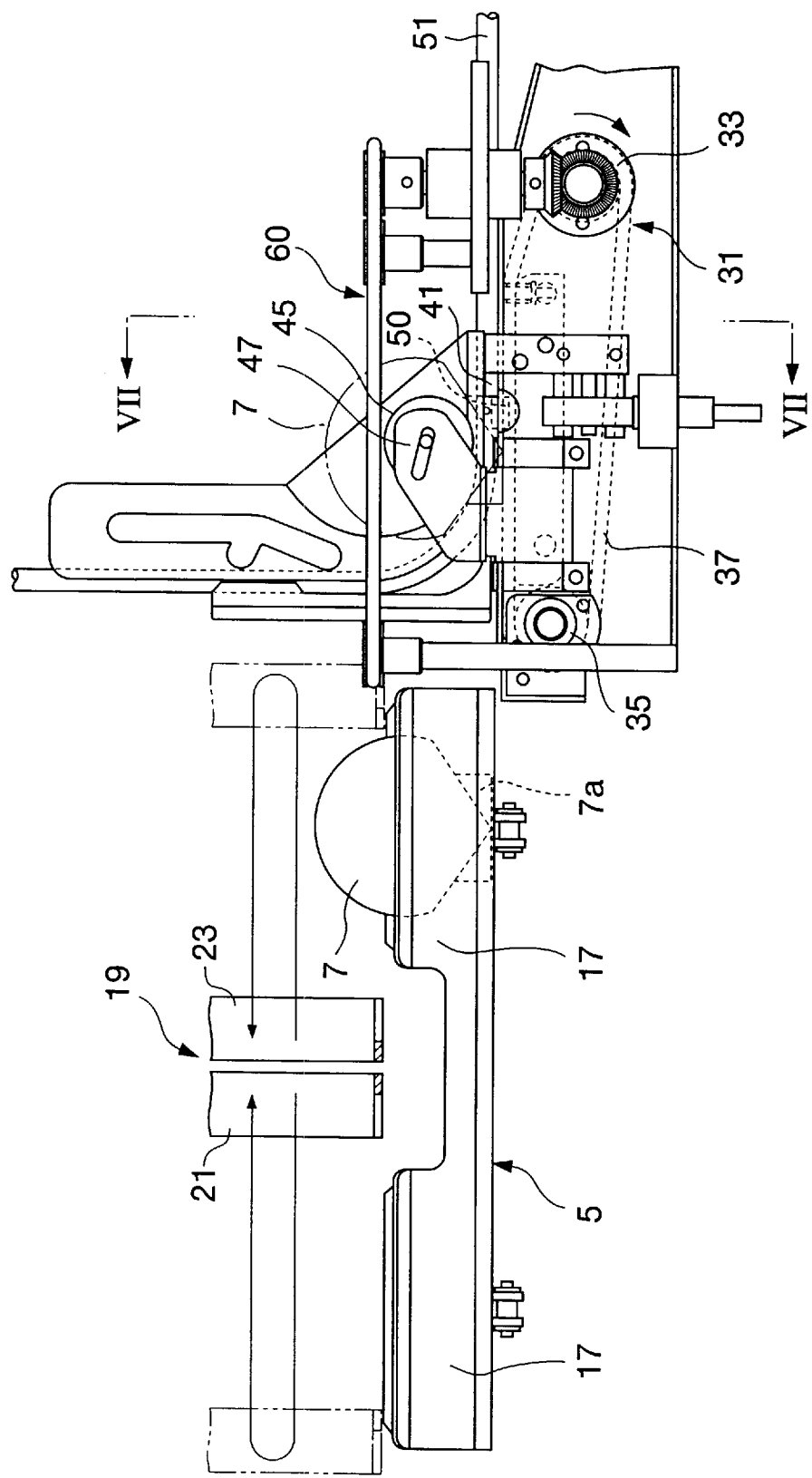
FIG. 6 is an enlarged front view showing the same part as shown in FIG. 5.

A continuous culture rope 51 is drawn from a drum (not shown) to pass horizontally through second shellfish transfer unit 31 between a pair of scallops 7, 7 (more specifically between the ear end portions 7a, 7a thereof) in the piercing position, and then directed upward, as shown in FIGS. 6 and 7.

Figure 14:
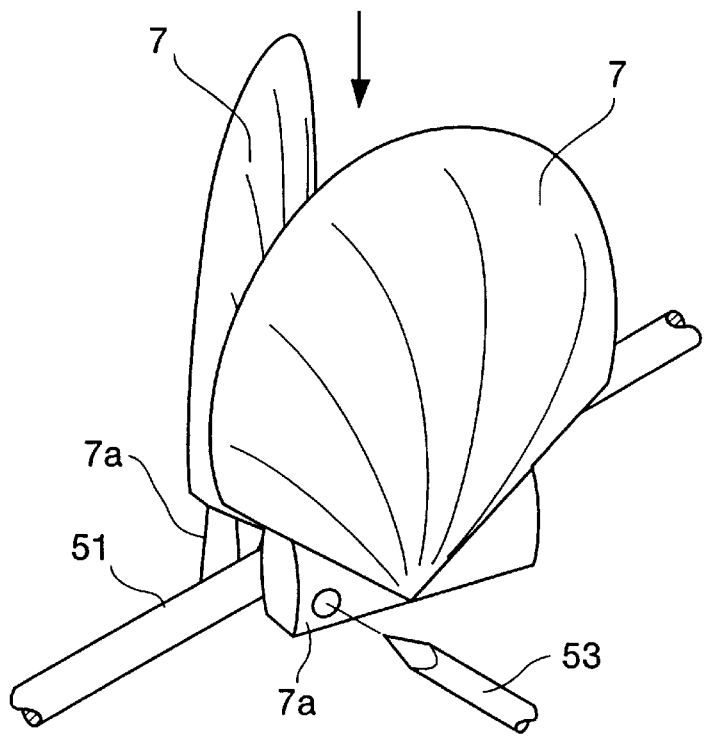
FIG. 14 is schematic view showing a positional relationship between two scallops and a culture rope extending therebetween and also showing a manner of piercing the ear end portions of the two scallops and the culture rope.
Figure 15:
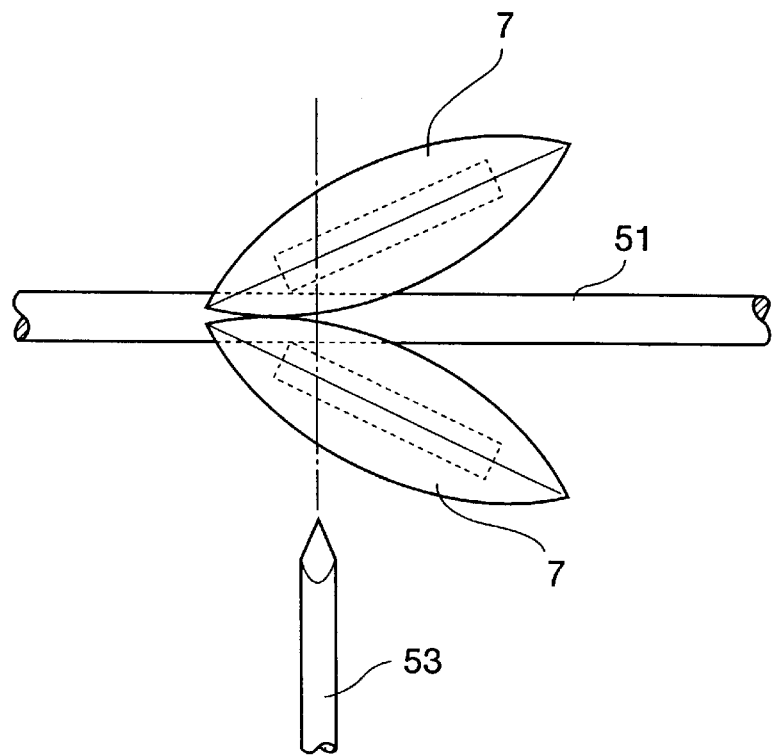
FIG. 15 is a plan view showing the same positional relationship and the same manner as shown in FIG. 14.

As best shown in FIG. 7, an ear spacer 50 of resilient material is fitted between stoppers 39, 41, which cooperates with shellfish supporting pads 43, 45 to stably support scallops 7 in the piercing position. Ear spacer 50 contacts softly with the inner walls of the ear end portions 7a, 7a of a pair of scallops 7, 7 in the piercing position, so that ear end portions 7a, 7a are, spaced from each other with a predetermined spacing therebetween, substantially in a parallel relation with each other and with the horizontally running culture rope 51. This facilitates stable positioning and posture of scallops 7, 7 in the piercing position. But for ear spacer 50, as shown in FIGS. 14 and 15, scallops 7, 7 could not stand in a parallel relation but open or tilt with respect to culture rope 51, which makes it difficult to pierce ear end portions 7a, 7a thereof by a piercing unit 53. In this embodiment, a pair of scallops 7, 7 are stably supported by a pair of shellfish supporting pads 43, 45 and ear spacer 50 arranged therebetween, at the piercing position defined by stoppers 39, 41. Scallops 7, 7 are supported in upstanding posture with ear end portions 7a, 7a down, which provides stable positioning when compared with the scallops in the lying state. If scallops should be lying, they easily move, rotate or vibrate and can not be held in stabile fashion. Supporting scallops in upstanding posture is also advantageous because it is not affected by any size difference of scallops.

Referring again to FIG. 1, a pair of piercing units 53, 53 are symmetrically arranged on one side of scallops 7, 7 in the piercing position. Each piercing unit 53 has a drill for piercing in series ear end portions 7a, 7a of scallops and culture rope 51 extending therebetween. On the opposite side of scallops 7, 7 in the piercing position, a pair of pin insert units 57, 57 are arranged. Pin insert units 57, 57 are respectively opposed to and aligned with piercing units 53, 53 and, in operation, insert connecting pins 59 into holes in ear end portion 7a of one scallop 7, culture rope 51 and ear end portion 7a of another scallop 7, in the order, after the holes have been pierced by the opposed piercing units 53, 53. FIGS. 19–22 show an example of connecting pins 59 to be used in this embodiment, which is formed into a series of separatable connecting pins 59. By inserting the arrow head 59a of connecting pin 59 into the pierced holes in ear end portions 7a, 7a of a pair of scallops 7, 7 and culture rope 51 positioned therebetween, they are bound on a narrow shaft 59b of connecting pin 59 and prevented from escaping due to arrow head 59a and an expanded base 59c at both ends of connecting pin 59.

After completing the above-described piercing and pin-inserting operation, culture rope 51 is moved in a predetermined length so that a pair of scallops 7, 7 which have been connected by pin 59 to a point of culture rope 51 also move toward the outside (to the left and right in FIG. 1) of the apparatus. Then, the next pair of scallops 7, 7 are brought to the piercing position by shellfish pusher members 21, 23 and second shellfish transfer units 29, 31 to be subjected to the piercing and pin-inserting operation. In this way, plural pairs of scallops 7, 7 are continuously and sequentially connected to culture rope 51 at predetermined even interval. If one or both of scallops 7, 7 in the piercing position fails to be connected to culture rope 51, stoppers 39, 41 are opened to the stand-by positions shown by phantom lines in FIG. 5 so that second shellfish transfer units 29, 31 discharge such scallops out of the apparatus.

With the above-described apparatus, a pair of scallops 7, 7 are held in the piercing position with their ear end portions 7a, 7a extending normal to the piercing and pin-inserting direction. Accordingly, the piercing and pin-inserting operation can easily be done irrespective of size of scallops.

In the illustrated embodiment, a pair of scallops 7, 7 are transferred from the entry position (A) to the turning position (B) by the first shellfish transfer unit 5 having a pair of parallel rows of shellfish holders 17, 17, and then to the piercing positions by a pair of the second shellfish transfer units 29, 31. Each shellfish holder 17 holds a pair of scallops and second shellfish transfer unit 29, 31 transfers one pair by one pair to the piercing positions on the opposite sides of the apparatus. The piercing and pin-inserting operation are carried out at opposite two piercing positions. Thus, the apparatus of this embodiment is completely symmetric and allows dual operation at the same time, thereby increasing working efficiency.

Figure 5:
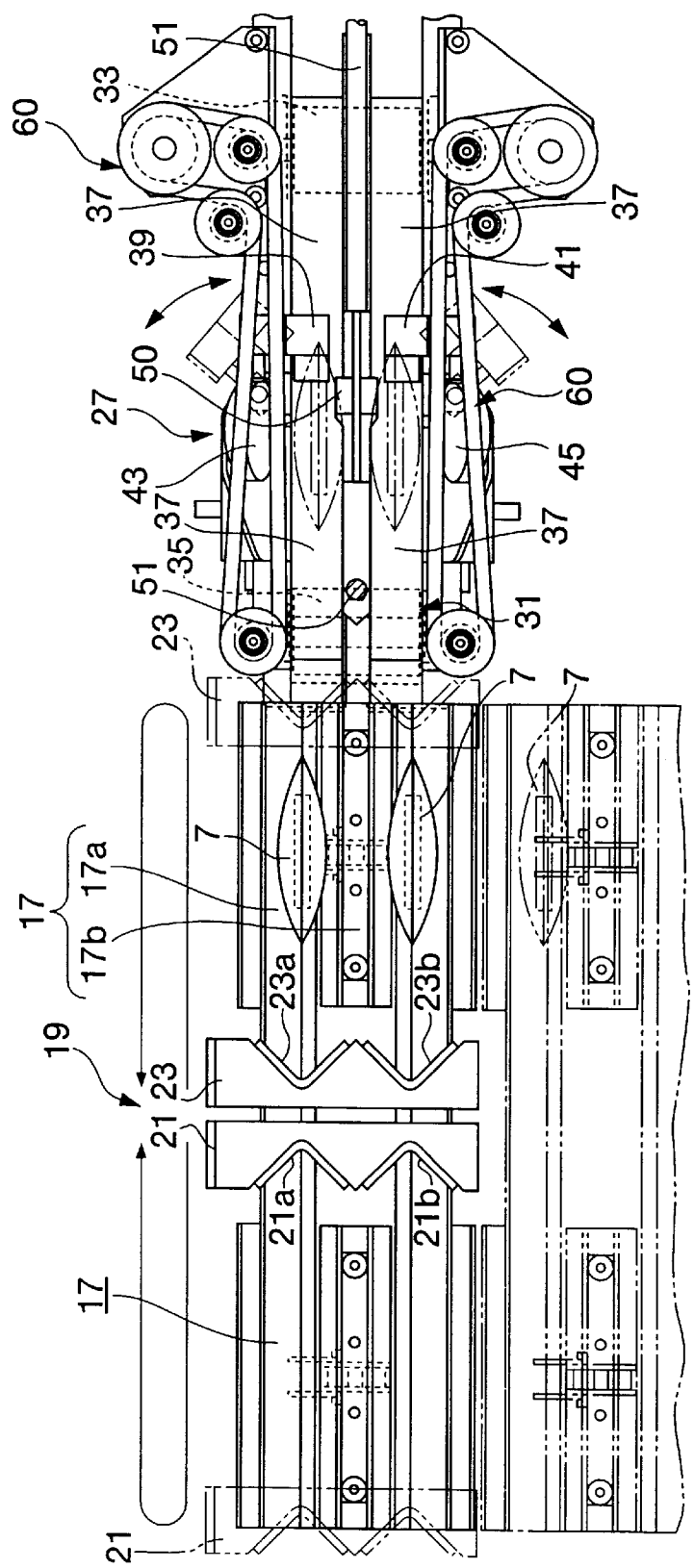
FIG. 5 is an enlarged plan view showing a part of the apparatus including a second shellfish transfer unit.

It is necessary to provide means for supporting scallops 7, 7 with their upstanding posture while they are transferred by second shellfish transfer units 29, 31 (belt 37) from the forward end position (shown by solid lines in FIGS. 5 and 6) of shellfish pusher members 21, 23 to the piercing position where they can be stably supported by cooperation of stoppers 39, 41, ear spacer 50 and shellfish supporting pads 43, 45. For example, as shown in FIG. 5 and 6, a pair of supporting belt conveyors 60, 60 are provided on opposite sides of belt 37. The supporting belt conveyors are running on substantially horizontal plane, at a speed substantially equal to the transfer speed of belt 37, and support and guide scallops 7, 7 being transferred on belt 37 at a level of substantially a half of the height of scallops 7, 7 or somewhat higher.

Although a preferred embodiment of the present invention has been described in detail in reference to the accompanying drawings, it is to be understood that many variations and modifications may be made without departing from spirits and scopes of the present invention as defined in the appended claims. Scallop is illustrated as a typical example of shellfish, but the apparatus of this invention can treat any kind of bivalves. The apparatus may not have a symmetric arrangement, which provide a single operation for connecting a pair of scallops to a culture rope. A connecting pin used for connection of a pair of scallops to a culture rope may be of any desired kind and any desired shape.

In the illustrated embodiment, the rotatable stoppers 39, 41 are mounted to stop the scallops at the predetermined piercing position while the belt 37 of the second shellfish transfer units 29, 31 continues running. In a modified embodiment, sensor means such as optical sensor, ultrasonic sensor and limit switch is used to determine that the scallops have reach the piercing position, in which case the belt comes to a stop in response to a signal from the sensor.

The shellfish supporting pads 43, 45 may be actuated by using a cam mechanism or any desired mechanism. Cylinder rods 49, 49 are not always necessary and arm members 47, 47 may be rotated directly by a motor.

What is claimed is:

1. An apparatus for connecting shellfish to a culture rope comprising a shellfish transfer unit that transfers shellfish in a predetermined direction, shellfish being transferred, two by two, in parallel upstanding orientation with their ear end portions down; stopper means for stopping, at a predetermined stop position, the shellfish transferred by said shellfish transfer unit; a rope supplying unit that supplies a culture rope to a space between ear end portions of two shellfish in the stop position; an ear spacer arranged between and contacting with the ear end portions of two shellfish in the stop position; a pair of shellfish supporting pads cooperating with said ear spacer to support therebetween two shellfish in the stop position; a piercing unit that pierces, in series, the ear end portions of two shellfish held in the stop position and the culture rope supplied between the ear end portions by said rope supplying unit; and a pin inserting unit that inserts a connecting pin into holes pierced by said piercing unit in the ear end portions and the culture rope to connect the two shellfish to the culture rope.

2. An apparatus according to claim 1 wherein said shellfish transfer unit comprises a first transfer unit that transfers shellfish in a first predetermined direction to a turning position and a second transfer unit that transfers shellfish from the turning position to the stop position in a second predetermined direction substantially perpendicular to the first predetermined direction.

3. An apparatus according to claim 2 wherein said second transfer unit comprises first means for forcing the shellfish from the turning position to an intermediate position and second means for conveying the shellfish from the intermediate position to the stop position.

4. An apparatus according to claim 3 wherein said first means comprises one or more of reciprocating pusher members adapted to push shellfish forward in the second predetermined direction, and said second means comprises one or more of belt conveyors adapted to receive the shellfish from said pusher members and further convey the shellfish forward in the second predetermined direction.

5. An apparatus according to claim 4 wherein said belt conveyor conveys the shellfish at a speed higher than by the pusher members.

6. An apparatus according to claim 2 wherein said second transfer unit transfers shellfish further from the stop position substantially in the second predetermined direction irrespective of whether either said piercing unit and/or said pin inserting unit operate in success or failure.

7. An apparatus according to claim 1 wherein said stopper means includes one or more stopper members arranged in the path of transfer of said shellfish transfer unit.

8. An apparatus according to claim 1 wherein said stopper means includes one or more sensors for detecting that the shellfish reach the stop position.

9. An apparatus according to claim 8 wherein said shellfish transfer unit stops when said sensor detects that the shellfish reach the stop position.

10. An apparatus according to claim 1 wherein said ear spacer is made of soft elastic material.

11. An apparatus according to claim 1 wherein said ear spacer is made of urethane rubber material.

12. An apparatus according to claim 1 wherein there are provided a pair of said shellfish transfer units, and said stopper means, said rope supplying unit, said ear spacer, a pair of said shellfish supporting pads, said piercing unit and said pin inserting unit are arranged for each of said shellfish transfer units, so that four shellfish are connected to two culture ropes at the same time.

\* \* \* \* \*